US012205009B2

(12) United States Patent
Singh et al.

(10) Patent No.: US 12,205,009 B2
(45) Date of Patent: Jan. 21, 2025

(54) INFORMATION TECHNOLOGY SERVICE INCIDENT TICKET ASSIGNMENT

(71) Applicant: Oracle International Corporation, Redwood Shores, CA (US)

(72) Inventors: Praphul Singh, Bengaluru (IN); Murari Tikmani, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 881 days.

(21) Appl. No.: 17/106,353

(22) Filed: Nov. 30, 2020

(65) Prior Publication Data
US 2022/0172024 A1  Jun. 2, 2022

(51) Int. Cl.
G06N 3/084 (2023.01)
G06N 3/044 (2023.01)
G06N 3/045 (2023.01)
G06N 3/063 (2023.01)
G06N 3/08 (2023.01)

(52) U.S. Cl.
CPC ............. *G06N 3/044* (2023.01); *G06N 3/045* (2023.01); *G06N 3/063* (2013.01); *G06N 3/08* (2013.01)

(58) Field of Classification Search
CPC ........ G06N 3/044; G06N 3/045; G06N 3/063; G06N 3/08
See application file for complete search history.

(56) References Cited

U.S. PATENT DOCUMENTS

| | | | |
|---|---|---|---|
| 11,416,823 B2 * | 8/2022 | Malhotra | G06F 40/279 |
| 2014/0278646 A1 | 9/2014 | Adrian et al. | |
| 2016/0371369 A1 * | 12/2016 | Cormack | G06F 16/23 |
| 2018/0211260 A1 | 7/2018 | Zhang et al. | |
| 2019/0066360 A1 * | 2/2019 | Jiao | H04L 1/0071 |
| 2019/0132191 A1 | 5/2019 | Mann et al. | |
| 2019/0139054 A1 * | 5/2019 | Mathrubootham | G06Q 30/016 |

(Continued)

FOREIGN PATENT DOCUMENTS

EP  3065090 A2 *  9/2016  ........... G06F 18/214

OTHER PUBLICATIONS

Hidasi, Balazs, and Alexandros Karatzoglou. "Recurrent neural networks with top-k gains for session-based recommendations." In Proceedings of the 27th ACM international conference on information and knowledge management, pp. 843-852. 2018. (Year: 2018).*

(Continued)

*Primary Examiner* — Michael J Huntley
*Assistant Examiner* — Skylar K Vanwormer
(74) *Attorney, Agent, or Firm* — Potomac Law Group, PLLC

(57) ABSTRACT

Embodiments assign an information technology service ticket to a queue and a sub-queue for optimized servicing. Embodiments extract from the service ticket a summary of the service ticket and a description of the service ticket. Embodiments provide as input to a trained neural network model the summary and description, the trained neural network model including a coarse network and a fine network. Embodiments predict the queue using the coarse network and predict the sub-queue using the fine network. Embodiments determine an uncertainty loss for the neural network model and when the uncertainty loss is below a threshold, assign the service ticket to the predicted queue and sub-queue.

20 Claims, 7 Drawing Sheets

(56) References Cited

U.S. PATENT DOCUMENTS

| | | | |
|---|---|---|---|
| 2019/0325068 A1* | 10/2019 | Lai | G06F 16/951 |
| 2020/0017117 A1* | 1/2020 | Milton | G08G 1/0112 |
| 2020/0125992 A1 | 4/2020 | Agarwal et al. | |
| 2020/0151648 A1 | 5/2020 | Gorny | |
| 2020/0202302 A1 | 6/2020 | Rathod et al. | |

OTHER PUBLICATIONS

Yang, Yingrui, Christopher Miller, Peng Jiang, and Azadeh Moghtaderi. "A case study of multi-class classification with diversified precision recall requirements for query disambiguation." (Year: 2020).*

Kunwar, Saket. "U-net ensemble for semantic and height estimation using coarse-map initialization." In IGARSS 2019—2019 IEEE International Geoscience and Remote Sensing Symposium, pp. 4959-4962. IEEE, 2019. (Year: 2019).*

Klaassen, Pim. "Using neural networks to model the behavior in vessel trajectories." (2019) (Year: 2019).*

Hidasi, Balazs, and Alexandros Karatzoglou. "Recurrent neural networks with top-k gains for session-based recommendations." In Proceeding sof the 27th ACM INternational confrence on information and knowledge management, pp. 843-852. 2018 (Year: 2018).*

Yang, Yingrui, Christopher Miller, Peng Jiang, and Azadeh Moghtoderu. "A case study of multi-class classification with diversified precision recall requirements for query disambiguation." (Year: 2020).*

Li, Xiaobin and Shengjin Wang, "Object Detection Using Convolutional Neural Networks in a Coarse-to-Fine Manner", 2017, IEEE (Year: 2017).*

Li, Xiaobin and Shengjin Wang, "Object Detection Using Convolutional Neural Networks in a Coarse-to-Fine Manner", Nov. 2017, IEEE, p. 2039 (Year: 2017).*

Brownlee, Jason. "How to Develop a Naive Bayes Classifier from Scratch in Python." (2020) (Year: 2020).*

Kunwar, Saket. "U-net ensemble for semantic and height estimation using coarse-map initialization." In IGRASS 2019—2019 IEEE International Geoscience and Remote Sensing Symposium, pp. 4959-4962. IEE, 2019. (Year: 2019).*

Cashman, Dylan, Genevieve Patterson, Abigail Masco, Nathan Watts, Shannon Robinson, Remco Chang. "RNNbow: Visualizing Learning via Backpropagation Gradients in RNNs." p. 3. IEEE, 2018 (Year: 2018).*

Raghuwanshi, Bhagat Singh and Sanyam Shulka/ "Class-specific cost-sensitive boosting weighted ELM for class imbalance learning." Springer, 2018. (Year: 2018).*

Klaassen Pim, "Using neural networks to model the behavior in vessel trajectories", 2019, TUDelft (Year: 2019).*

Altintas et al., Machine Learning Based Ticket Classification Inissue Tracking Systems, Proceedings of the International Conference on Artificial Intelligence and Computer Science (AICS 2014), Sep. 15-16, 2014, Bandung, Indonesia.

Diao et al., Rule-based Problem Classification in IT Service Management, 2009 IEEE International Conference on Cloud Computing, pp. 221-228, downloaded on Jul. 29, 2020.

K et al., Auto Ticket Assignment to the Right Functional Groups Using Machine Learning and RPA Techniques, Jul. 21, 2020; https://medium.com/@blogsupport/auto-ticket-assignment-to-the-right-functional-groups-using-machine-learning-and-rpa-techniques-fcd59ea87d4c.

Mandal, Cognitive system to achieve human-level accuracy in automated assignment of helpdesk email tickets, arXiv:1808.02636v2 [cs.Al], Aug. 9, 2018, pp. 1-10.

Singh et al., CFNet: Deep Learning Based Multi-Level Architecture for Coarse & Fine Grained Tickets Assignment; Jun. 30, 2020, pp. 1-8.

Unknown, The Machine Learning Primer, A SAS Best Practices E-Book, https://www.sas.com/en_us/whitepapers/machine-learning-primer-108796.html?utm_source=google&utm_medium=cpc&utm_campaign=ai-ml-us&utm_content=GMS-62586&keyword=%252Bsas+%252Bmachine+%252Blearning&matchtype=b&publisher=google&gclid=EAlalQobChMluNKCjr6q7QIV68uGCh1PBARhEAAYASAAEgISfPD_BwE; last downloaded Jul. 29, 2020.

Zhou et al., STAR: A System for Ticket Analysis and Resolution, KDD 2017 Applied Data Science Paper, Aug. 13-17, 2017, Halifax, NS, Canada, pp. 2181-2190.

\* cited by examiner

INFORMATION TECHNOLOGY SERVICE INCIDENT TICKET ASSIGNMENT

FIELD

One embodiment is directed generally to a computer system, and in particular to a computer system that assigned service incident tickets.

BACKGROUND INFORMATION

Enterprise systems are commonly supported by Information Technology ("IT") service management systems that allow users to file incident service requests/tickets related to IT service issues, receive assistance in handling or resolving the issues, and track the progress of the issues until the issues are resolved. To expedite resolution of the issues, IT service management systems route incident tickets for the issues to agents or groups of agents with experience and expertise in handling the issues. The agents then carry out workflows and interface with the users to resolve the issues and close the incident tickets.

SUMMARY

Embodiments assign an information technology service ticket to a queue and a sub-queue for optimized servicing. Embodiments extract from the service ticket a summary of the service ticket and a description of the service ticket. Embodiments provide as input to a trained neural network model the summary and description, the trained neural network model including a coarse network and a fine network. Embodiments predict the queue using the coarse network and predict the sub-queue using the fine network. Embodiments determine an uncertainty loss for the neural network model and when the uncertainty loss is below a threshold, assign the service ticket to the predicted queue and sub-queue.

DETAILED DESCRIPTION

One embodiment is a service management system that receives a service incident ticket and uses machine learning and artificial intelligence to optimize the assignment of the ticket to the ideal queue/sub-queue so that the ticket will be handled by the best qualified service agent. Embodiments utilize a single architecture that predicts both course and fine classes in a single model.

Figure 1:
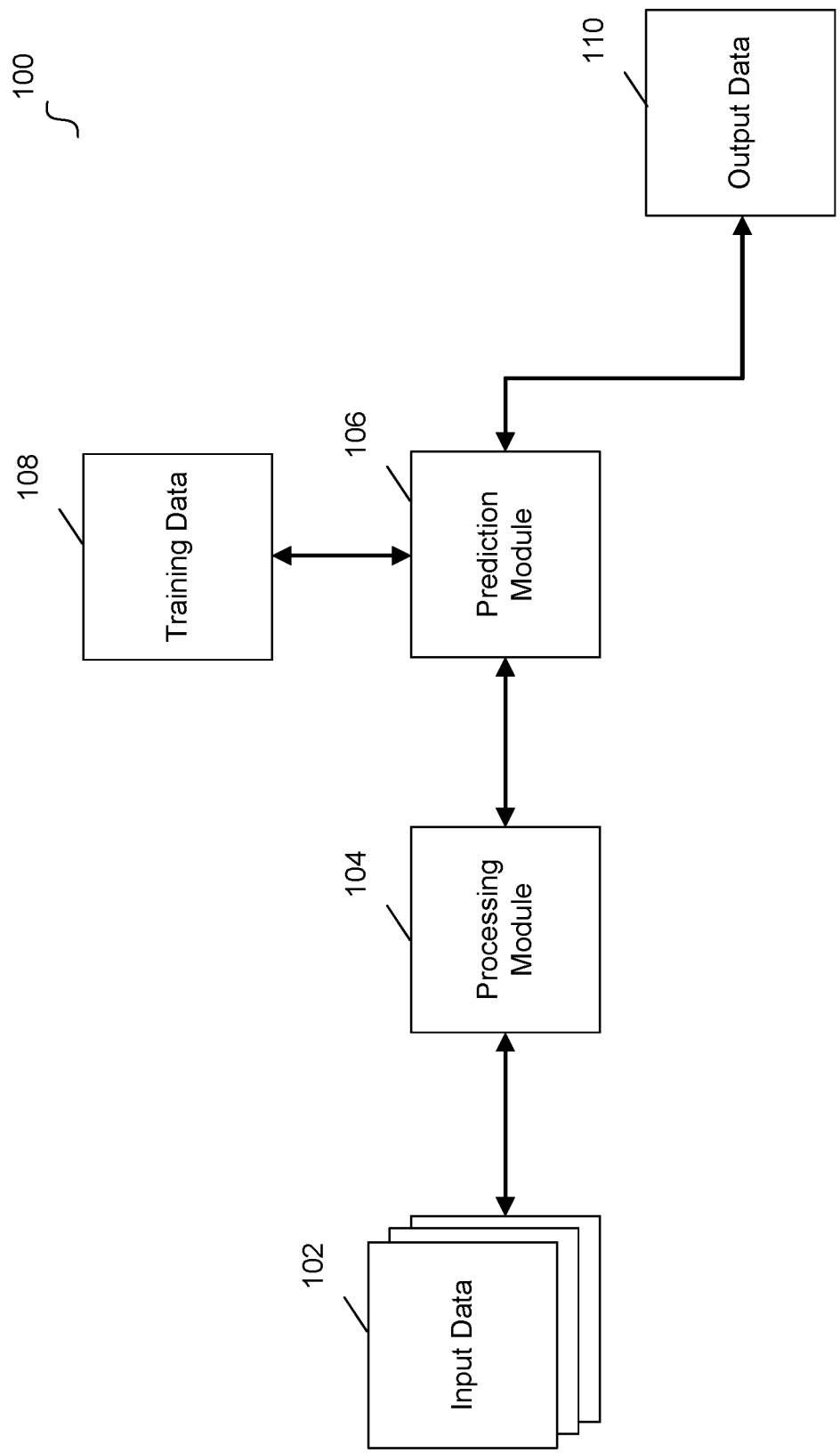
FIG. 1 illustrates a service management system using artificial intelligence according to an example embodiment.

FIG. 1 illustrates a service management system using artificial intelligence according to an example embodiment. System 100 includes input data 102, a processing model 104, a prediction module 106, training data 108, and output data 110. In some embodiments, input data 102 can include several elements or rows of data, and the data can be processed or "preprocessed" by processing module 104. For example, processing module 104 can generate metadata profiles based on input data 102. In some embodiments, the metadata profiles, not the input data itself, is fed to prediction module 106. In general, input data 102 is received data in response to user input to a service ticket user interface. The input can be free form text or in the form of drop down text choices that describe the problem that the user is undergoing. The description can include the name of the software product/module, the problematic functionality, etc.

In embodiments, prediction module 106 is a neural network, described in more detail below, that is trained by training data 108. For example, training data 108 can include labeled data, such as metadata profiles generated by processing labeled and/or structured data. In some embodiments, the output from processing module 104, such as the processed input data (e.g., metadata profiles), can be fed as input to prediction module 106. Prediction model 106 can generate output data 110, such as the assignment of service tickets to respective queues and sub-queues, in response to input data 102.

Figure 2:
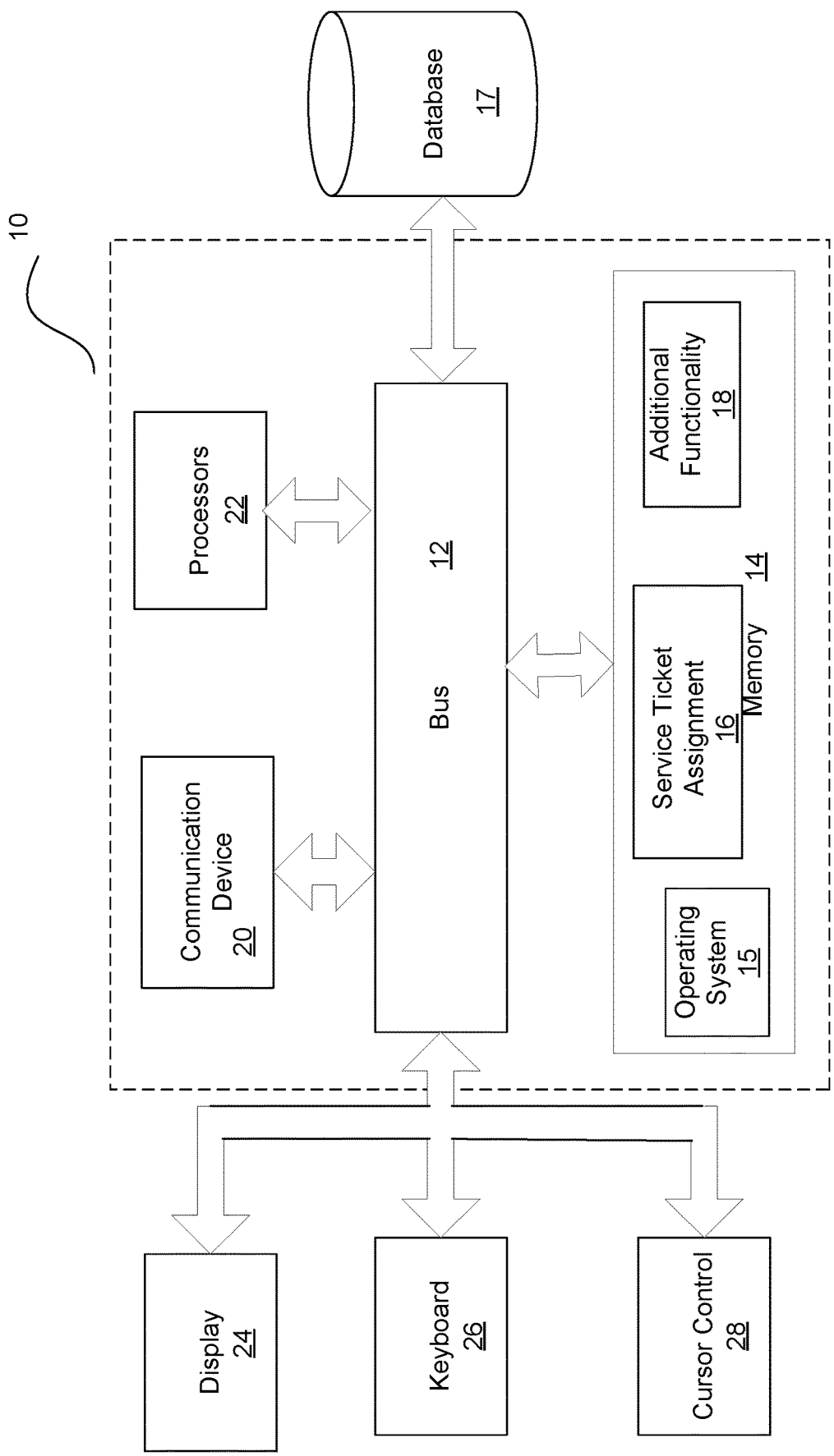
FIG. 2 is a block diagram of a computer server/system in accordance with an embodiment of the present invention.

FIG. 2 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. System 10 can centrally provide the functionality for all or some of the components shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a service ticket assignment module 16 that assigns service tickets to the optimized queue/sub-queue detection, and all other functionality disclosed herein. System 10 can be part of a larger system. Therefore, system 10 can include one or more additional functional modules 18 to include the additional functionality, such as an enterprise application (e.g., an enterprise resource planning ("ERP") system) or a cloud based application management system.

A database 17 is coupled to bus 12 to provide centralized storage for modules 16 and 18 and data related to the queues, training data, etc. In one embodiment, database 17 is a relational database management system ("RDBMS") that can use Structured Query Language ("SQL") to manage the stored data In one embodiment, particularly when there are a large number of applications to be serviced and a large number of queues, model nodes, etc., database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than a disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations. The applications and computing system 10 may be configured to operate with or be implemented as a cloud-based networking system, a software-as-a-service ("SaaS") architecture, or other type of computing solution.

As disclosed, the assignment of a service request/ticket to an optimized queue and sub-queue has been a major challenge in the industry as there are typically a large number of queues and sub-queues (which correspond to coarse classes and fine classes disclosed below). The queues and the sub-queues provide to a hierarchical description of the product(s) impacted by the service issue, which can include higher-level categories such as software product groups/families and lower level sub-queues such as the actual products that are of interest. The assignment of a queue and sub-queue is generally done based on user input and the user's knowledge of the ticketing system. This process is prone to error as a user may choose a different/incorrect queue for various reasons.

For a large enterprise company with hundreds or even thousands of enterprise applications to provide service for, there are generally multiple ticketing systems in place to raise tickets for product defects, request for information, etc. Further, different ticketing system may be used by different parties, such as external customers, partners, employees and contractors. Problems that arise in known ticketing systems include: a) there are far too many products to choose from when the issue is being raised by a user; b) after the ticket has been assigned to an agent/engineer (who is an expert in the project chosen by the user), it may turn out that the issue is unrelated to the engineer's area of expertise, however it is generally very difficult to re-assign the ticket; and c) data skewness (i.e., the number of tickets per product line is imbalanced) such as a few of the product lines have a very large number of data points and a majority of them have a very low data set. These issues eventually lead to service level degradation and also incurs cost.

In general, the above problems have previously been solved in some solutions by initiating a predefined rule based workflow which user goes through to arrive at the queue and sub-queue for their issue. Other known solutions further include using machine learning techniques that attempt to assign the ticket to the correct/optimized queue. In contrast, embodiments provide a novel hierarchical deep neural network assignment architecture which assigns the ticket to a dual layer queuing system using the summary and description provided by the user while filing the ticket.

In problems where the number of classes (i.e., the universe of possible final assignments to a sub-queue for the ticket) becomes very high, generally the performance tends to degrade due to the high correlations between some classes. In order to overcome these problems, embodiments first group the classes into a few number of super-classes (i.e., coarse classes) and then make subsequent fine predictions. In general, creating a coarse model and then a separate model for each class requires a lot of pipe-lining and requires a large memory, which is not an efficient solution and inhibits the scaling of the product. In contrast, embodiments implement a novel single architecture, referred to as a "Coarse Fine Network" ("CFNet") which can predict both the coarse (i.e., queues) and fine classes (i.e., sub-queues) in a single shot and is memory efficient. In one embodiment, there is a single layer of sub-queues, but other embodiments can have multiple layers of sub-queues.

Embodiments utilize an "imbalanced classification" to handle the two types of classes. An imbalanced classification problem is an example of a classification problem where the distribution of examples across the known classes is biased or skewed. Known approaches to solving these problems include an oversampling approach where the minority classes are oversampled randomly or by generating new samples using algorithms such as "Synthetic Minority Oversampling Technique" ("SMOTE"). However, for Natural Language Processing ("NLP") problems where the data is sequential and the order of the sequence affects the meaning of the data points, SMOTE appears to perform badly. Another approach is under-sampling the majority classes which ultimately leads to under-fitting the model, thus reducing the overall metrics. Another approach has been to alter the algorithm by adding class weights to the loss function, which again has a very slight improvement over the other known approaches.

In contrast, embodiments implement a novel loss function which creates a balance between the required metric and the overall metrics of the model. Per class metrics include the recall and precision per class (i.e., sub-queue) and the overall metrics include accuracy, recall, precision and f1 score. Because imbalanced classes have very high predictive uncertainty because of the deficiencies in the number of samples for the minority classes, embodiments incorporate Bayesian deep learning techniques to make the model more trustworthy by reducing the uncertainty of the model.

Uncertainty

As disclosed above, for a problem involving an imbalanced dataset, it is a frequent possibility for the model to be uncertain in its predictions. Uncertainty is generally of two types: Epistemic and Aleatoric. Epistemic Uncertainty is the predictive uncertainty and it is calculated during test time. Aleatoric uncertainty is the model uncertainty because of incorrect estimation of the statistical features, such as mean and variance of the weights distribution of the model. To make the model trustworthy in these cases, embodiments implement a Bayesian architecture which predicts the Aleatoric uncertainty along with the class probabilities and solves the problem by minimizing the uncertainty loss.

Multi-Head Self Attention

Embodiments utilize long short-term memory ("LSTM"), which is an artificial recurrent neural network ("RNN") architecture used in the field of deep learning. Unlike standard feedforward neural networks, LSTM has feedback connections. However, in general, LSTMs can be problematic when the sequence is very long, such as longer than 100 words that is sometimes encountered in embodiments. A normal LSTM model comes up with a context vector for each word in the sentence but considers every other word in the sequence equally while computing the context vectors. Attention is a mechanism to learn the importance-weights each word should be given while computing a context vector. Multi-Head Self Attention does the same general thing but instead of taking the attention once, it attends different parts of the words learned by multiple agents (i.e., heads), thus making the context vector more robust. Embodiments utilize Multi-Head Set Attention for learning a robust feature vector for a input sample.

Loss Function

Embodiments implement an architecture that includes a loss function. Embodiments use the loss function to improve the recall per class, the overall metrics, and the trustability of the model. The final logits for the fine prediction are defined by a soft masking mechanism, where the coarse class probabilities are multiplied by their sub-classes probabilities, respectively, so that the model can focus more on the sub-classes of the predicted coarse class. The loss for the fine prediction is calculated by taking a categorical cross entropy of the final logits, achieved as follows:

Pred($c, f$)=Prob($c$)*Prob($f$), where c is the superclass of f

The loss for the coarse prediction is the usual categorical cross entropy of the coarse probabilities as follows:

CoarseLoss=-Pred($c_{true}$)*log$\_e$(Pred($c_{true}$))

One goal of the above is to find the conditional prediction by using probability for the coarse class and the fine class (i.e., given the probability of the coarse class c and a the fine class f, the goal is to find the prediction weight for the pair).

Embodiments define a recall loss for the model to focus more on the recall metric. The recall loss for a batch is defined by the following:

$$RecallLoss = 1 - \frac{\lambda}{N}\sum_i Recall_i$$

Where N is the number of classes and $i \in \{1,2,3, \ldots, N\}$.

If the recall is much less, it will force the loss to increase and thus the model will try to optimize itself in a manner to reduce the recall loss, thus improving the overall recall.

$\lambda$ is a constant defined by the following equation:

$$\lambda = \frac{\text{\# samples in minority classes}}{\text{\# samples in majority classes}}$$

In a Bayesian Network, embodiments predict the uncertainty of the model assuming the weights follow a gaussian distribution. To calculate the uncertainty loss, embodiments use two losses: coarse and fine loss. A gaussian distribution of zero mean and predicted variance is used to generate T Monte Carlo samples of noise probabilities which are added to the predicted class probabilities to get the final Monte Carlo samples. For each of the samples, categorical cross entropy loss (distorted loss) is calculated and the uncertainty loss is the difference between the distorted and undistorted loss. The loss is computed as follows:

$\sigma^2$=Predicted Variance by the model;
Distribution=N(0, $\sigma^2$);
Noise Samples=[sample for i in range(T)];
Distorted Probability samples=Predicted probabilities+ Noise Samples;
Variance Loss=$\Sigma$CCE(Distorted Samples)–Undistorted CCE, where CCE is used for categorical cross entropy;
Uncertainty Loss=Variance Loss+exp $\sigma^2$–1.
Model Loss=Uncertainty Loss+Coarse Loss+Fine Loss+ Recall Loss, where Coarse loss is the categorical cross entropy loss ("CCE") loss for coarse classes and Fine loss is the CCE loss for fine classes. The class probabilities are fed into the CCE function to get the loss for the model.

Figure 3:
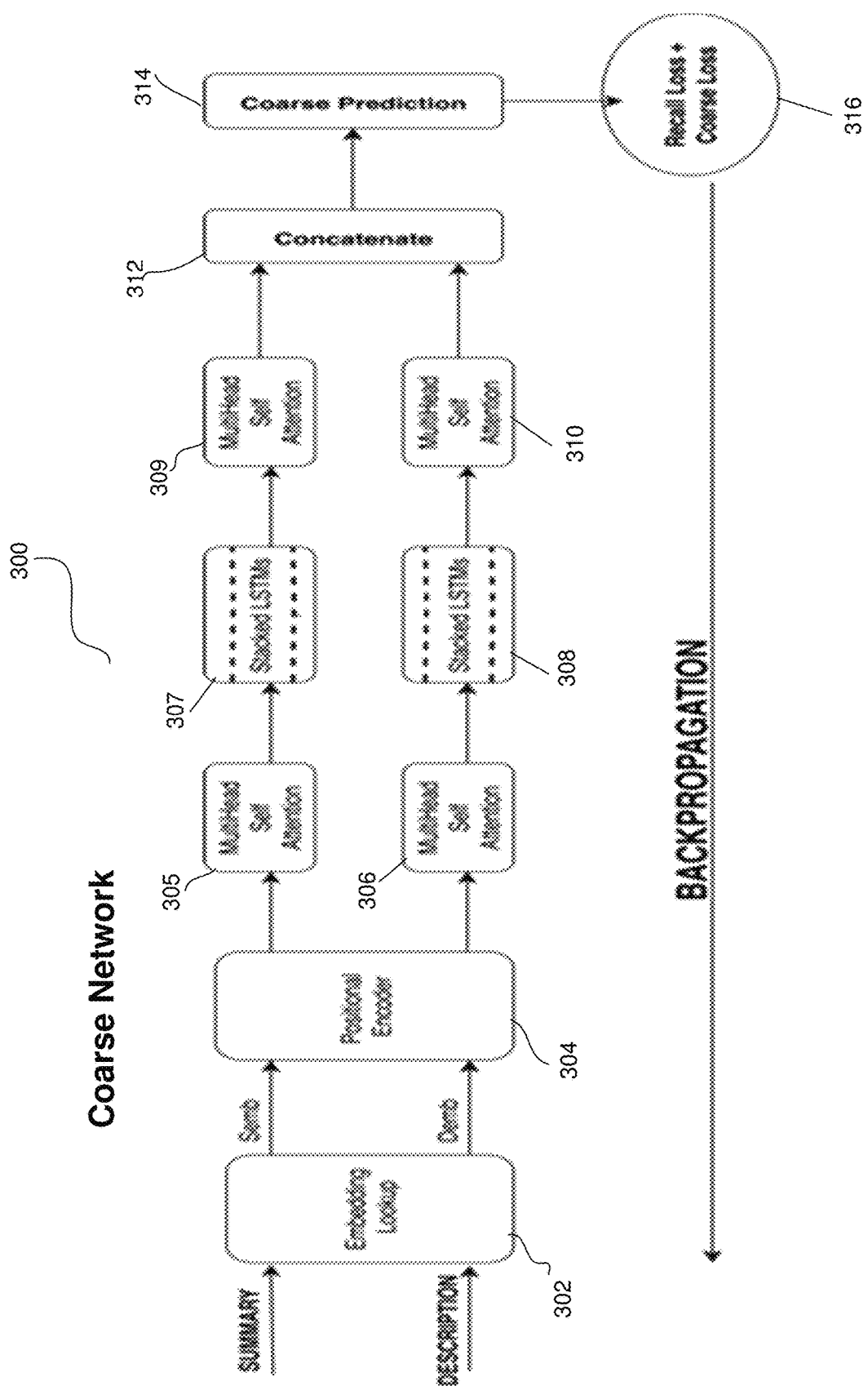
FIG. 3 illustrates a coarse network portion and FIG. 4 illustrates a fine network portion of the neural network.
Figure 4:
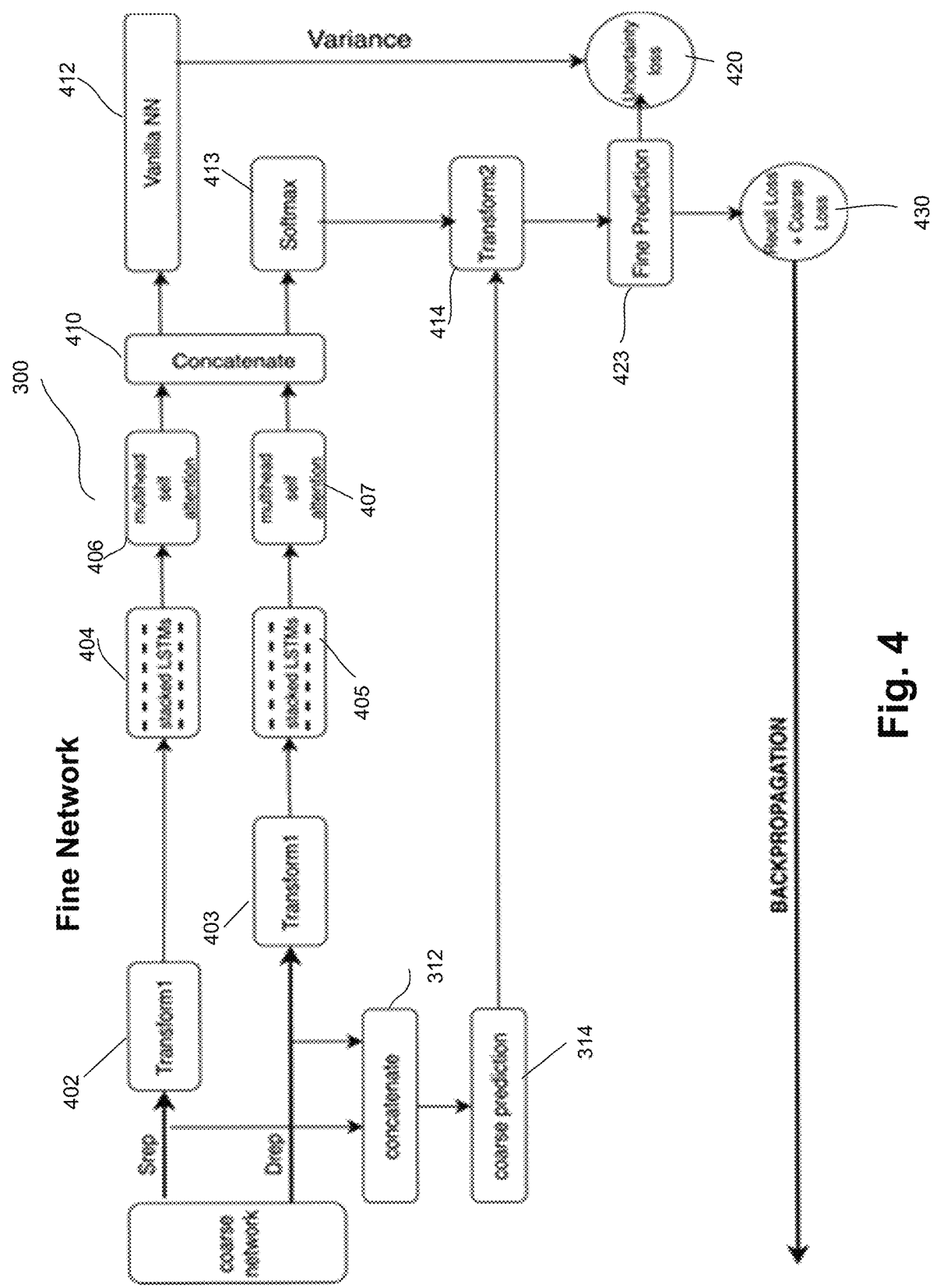

FIGS. 3 and 4 are block diagrams that collectively form the neural network model 300 in accordance to embodiments of the invention. Although FIGS. 3 and 4 form a single neural network, FIG. 3 illustrates a coarse network portion and FIG. 4 illustrates a fine network portion of the neural network.

Pre-Processing/Training

Figure 5:
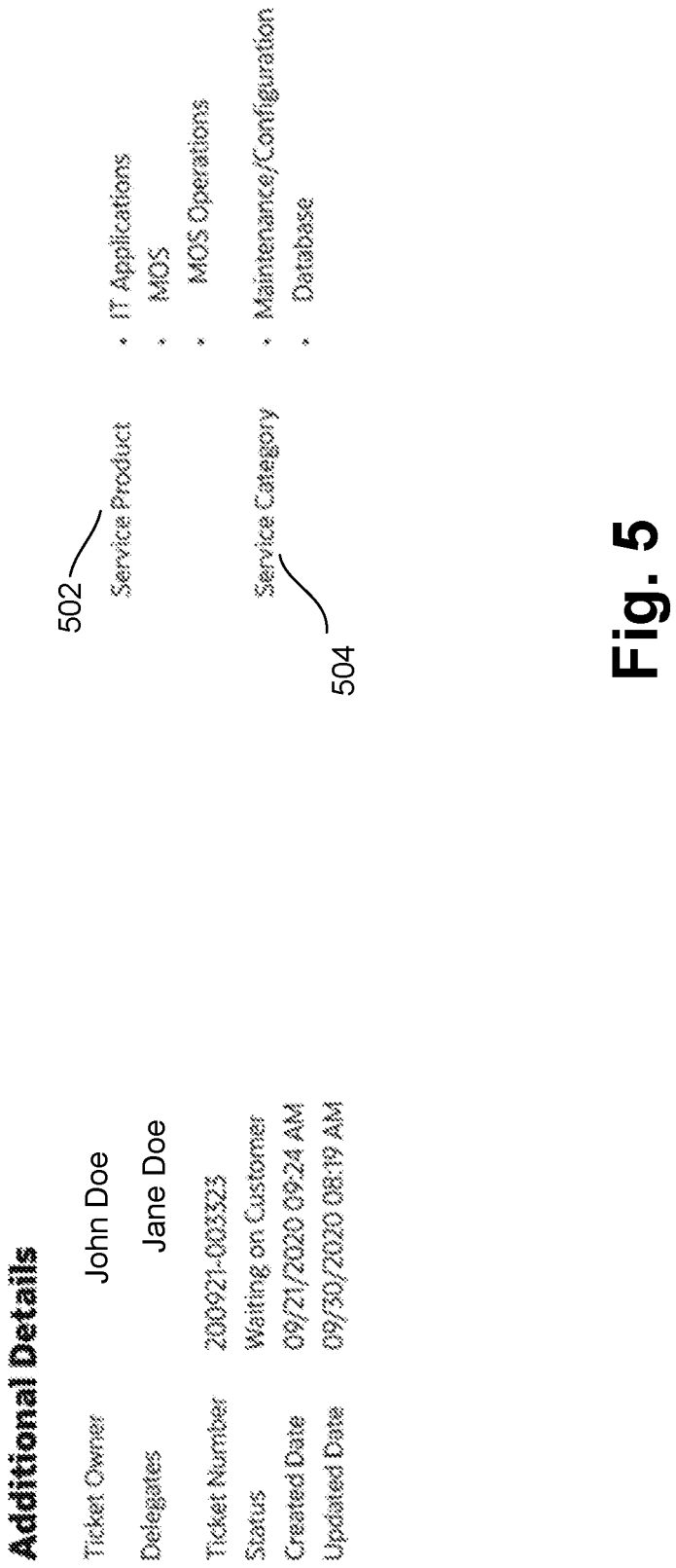
FIG. 5 illustrates an example of a service ticket in accordance to embodiments.

Embodiments use as data input the summary and description of the service problem from the filed ticket. FIG. 5 illustrates an example of a service ticket in accordance to embodiments. As shown, the service ticket includes information on the service product 502 at issue, as well as the service category 504 at issue. The information may be entered by the user in a freeform manner, or via a menu of possible options. The summary and description of the ticket that is used as data input can be retrieved directly from the ticket, after which the retrieved text may be processed to remove the noise and unnecessary characters or templates.

In embodiments, the Global Vectors for Word Representation ("GloVe") unsupervised learning algorithm for obtaining vector representations for words is used, which includes approximately 400,000 words, to which more frequent occurring unique words are added. Embodiments initialize the embeddings for the new words as 300 dimensional vectors with float values being generated from a normal distribution of mean 0 and standard deviation 1. The GloVe words are initialized with pre-trained Glove 300-dimensional embeddings.

Embodiments first clean the data by removing the non-alphanumeric characters except '?.!'. Then the texts are converted into lists of words and each word in the data is replaced by its position in the vocab. Embodiments limit the length of description to 100 words and summary to 10 words. Therefore, texts having lesser than the required lengths are padded by a mask token.

Neural Network

In embodiments, neural network 300 is implemented using "TensorFlow" and "Keras." TensorFlow is an end-to-end open source platform for machine learning. Keras is an open-source library that provides a Python interface for artificial neural networks and acts as an interface for the TensorFlow library. In general, the outputs of neural network model 300 are represented as the coarse prediction for the queues and the fine prediction for sub-queues.

In neural network 300, in the coarse network of FIG. 3, an embedding layer/lookup 302 receives the summary and description of the filed ticket as inputs. Words embedding, performed by embedding layer 302, is a way to represent words by creating high dimensional vector space in which similar words are close to each other. Embedding layer 302 has weights initialized by the initial word embeddings for the words and the trainable Boolean value is set to be True. There are two input layers in the model, one for description and one for summary. The outputs from the input layers are fed into embedding layer 302, which then outputs sequences of embedding vectors for the corresponding word positions as description embeddings ($D_{emb}$) and summary embeddings ($S_{emb}$).

For the MASK tokens, the embeddings are set to be zero. Then using the maximum allowed lengths and the dimensions of the embeddings, positional encodings are created separately for the summary and descriptions by positional encoder 304. The positional encodings are added to the embedding sequences to get the final embedding sequence. The embedding sequence is then fed into a Multi-Head Self Attention ("MHA") Layer 305, 306. Since embodiments are using it for a classification task, Self Attention is used, and therefore the Key, Query and Value for the MHA is the embedding sequence itself. The output sequence from MHA layer 305, 306 is then fed into a stack of Bidirectional LSTM layers 307, 308. Bidirectional LSTMs 307, 308 are used to get better semantic meanings of the inputs.

The output from the LSTMs layer 307, 308 is fed into an MHA layer 309, 310 and after flatting the final outputs ($S_f$ and $D_f$), two context vectors are generated, one for summary ($S_c$) and one for description ($D_c$). $S_c$ and $D_c$ are concatenated together at 312 and fed into a Softmax layer to get the coarse outputs ($C_{pred}$) 314. Recall loss and coarse loss 316 determines the loss function, as disclosed above. The recall loss is focused on the recall per class and forces the model to learn in a direction where the recall can be maximized. The coarse loss is the general CCE loss generated by using the coarse probabilities which handles the overall metrics, such as accuracy, recall, precision and f1 score. The backpropagation updates the weights of the neural network using the loss of the model. Two transformed inputs ($D_{inp}$ and $S_{inp}$) that are fed into the fine network are produced using ($S_f$ and $D_f$) and $C_{pred}$ as shown below:

Assume, $C_{pred}=[0.3,0.1,0.6]$ $S_f=[[1,2,3],[2,3,4],[4,5,6]]$
$D_f=[[1,3,4],[4,5,6],[3,4,5]]$
$D_{new}=[[1,3,4,1,3,4,1,3,4], [4,5,6,4,5,6,4,5,6], [3,4,5,3,4,5,3,4,5]]$
$S_{new}=[[1,2,3,1,2,3,1,2,3],[2,3,4,2,3,4,2,3,4],[4,5,6,4,5,6,4,5,6]]$
$CD_{pred}=[0.3,0.3,0.3,0.1,0.1,0.1,0.6,0.6,0.6]$
$CS_{pred}=[0.3,0.3,0.3,0.1,0.1,0.1,0.6,0.6,0.6]$
$D_{inp}=[p*CD_{pred}$ for p in $D_{new}]$
$S_{inp}=[p*CS_{pred}$ for p in $S_{new}]$ In neural network 300, in the fine network of FIG. 4, $S_f$ and $D_f$ (shown as $S_{rep}$ and $D_{rep}$) the inputs for the fine layer, which are transformed by transform1 function 402, 403 to generate $S_{inp}$ and $D_{inp}$ and which are again fed into a stack of bidirectional LSTM layers 404, 405 followed by an MHA layer 406, 407. The final flattened outputs are concatenated at 410 to get the final context vector. The final context vector is fed into a feed forward neural network 412 with output units=1 to obtain the uncertainty loss 420. The same context vector is fed into a Softmax layer 413 and then a transform2 function 414 to get the initial fine logits 423, $F_{logits}$. The $F_{logits}$ and $C_{pred}$ are processed to get $F_{pred}$ as shown as follows:

Assume there are 3 coarse classes and 10 fine classes out of which first 3 fine classes belong to the 1st coarse class, the next 4 belong to the 2nd coarse class and the last 3 belong to the 3rd coarse class.

$C_{pred}=[0.3,0.1,0.6]$
$C'_{pred}=[0.3,0.3,0.3,0.1,0.1,0.1,0.6,0.6,0.6]$
Suppose, $F_{logits}=[a, b, c, d, e, f, g, h, i, j]$
$F_{pred}=Softmax(C'_{pred}*F_{logits})$ The $F_{logits}$ are the energy values for fine classes which are further fed into the Softmax function to get the probability values (i.e., the fine prediction) for the fine classes. $C_{pred}$ is the probability vector for the coarse classes. The recall loss 430 is an additional loss function on top of the usual CCE loss to focus more on the recall per class of the model. The backpropagation takes the total loss of the model and computes the gradient of loss with respect to each of the model's weights and uses the gradient to update the weight values.

In an example implementation of embodiments to generate test results, the training was done with a dropout of 0.3 in the LSTM layers, Adam Optimizer, batch size=300, epochs=50 and 4 16 GB Nvidia Tesla V100 GPUs. The layers of the trained model were frozen and saved in Tensorflow Protobuf format for deployment.

Metrics used with neural network 300 include the loss, Top1, Top2, Top3 accuracies, precision, recall, F1 Score, and uncertainty scores.

Figure 6:
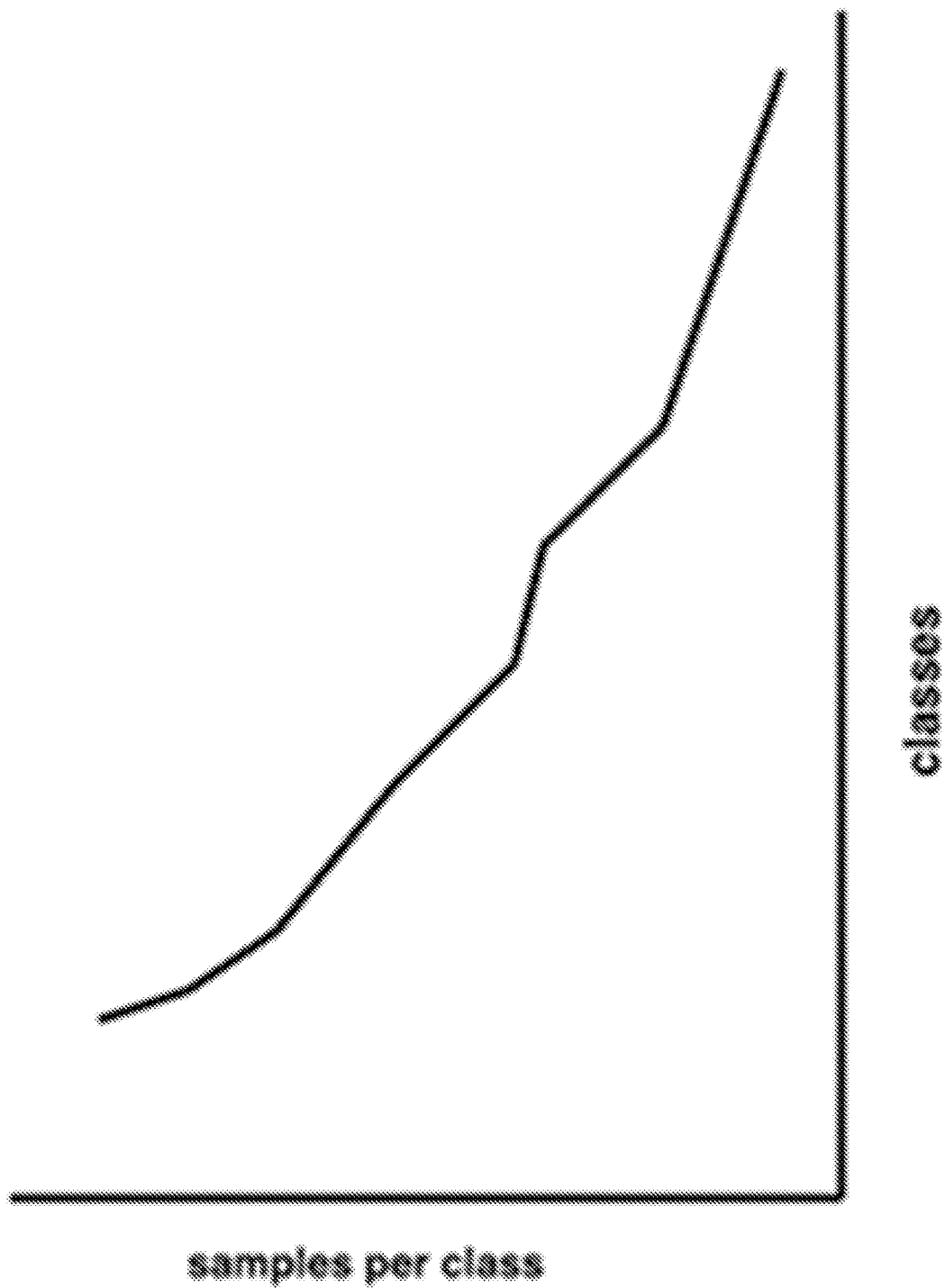
FIG. 6 is graph of samples per class vs. classes in accordance to embodiments.

The metric values calculated are model specific. However, embodiments use the following data to get the customer baseline with which the model results are compared for evaluation: The initial and final assignments for the tickets are used to get the customer precision and recall for the data. The final assignments are treated as the true labels and initial assignments are treated as the baseline predictions. One goal of the model is to improve the initial assignment for the tickets so as to eliminate the complex procedure to get the final assignment The results indicate an improvement over any generic baseline model. Embodiments use LSTMs as the baseline model, and Table 1 below shows a comparison of the baseline model (i.e., a simple 2-LSTM layered network with pre-trained Glove embeddings) with embodiments of the invention ("CFNet") and shows how overall performance is significantly improved on a highly imbalanced dataset. The results are for a model which uses 43 classes and the distribution of samples per classes follows a trend similar to the curve shown in FIG. 6.

| Models | F1Score | Recall | Precision | Top1 Accuracy | Top1 Accuracy | Top3 Accuracy |
|---|---|---|---|---|---|---|
| Baseline | 70 | 66 | 75 | 67 | 71 | 75 |
| CFNet | 80 | 76 | 86 | 79 | 88 | 91 |

Figure 7:
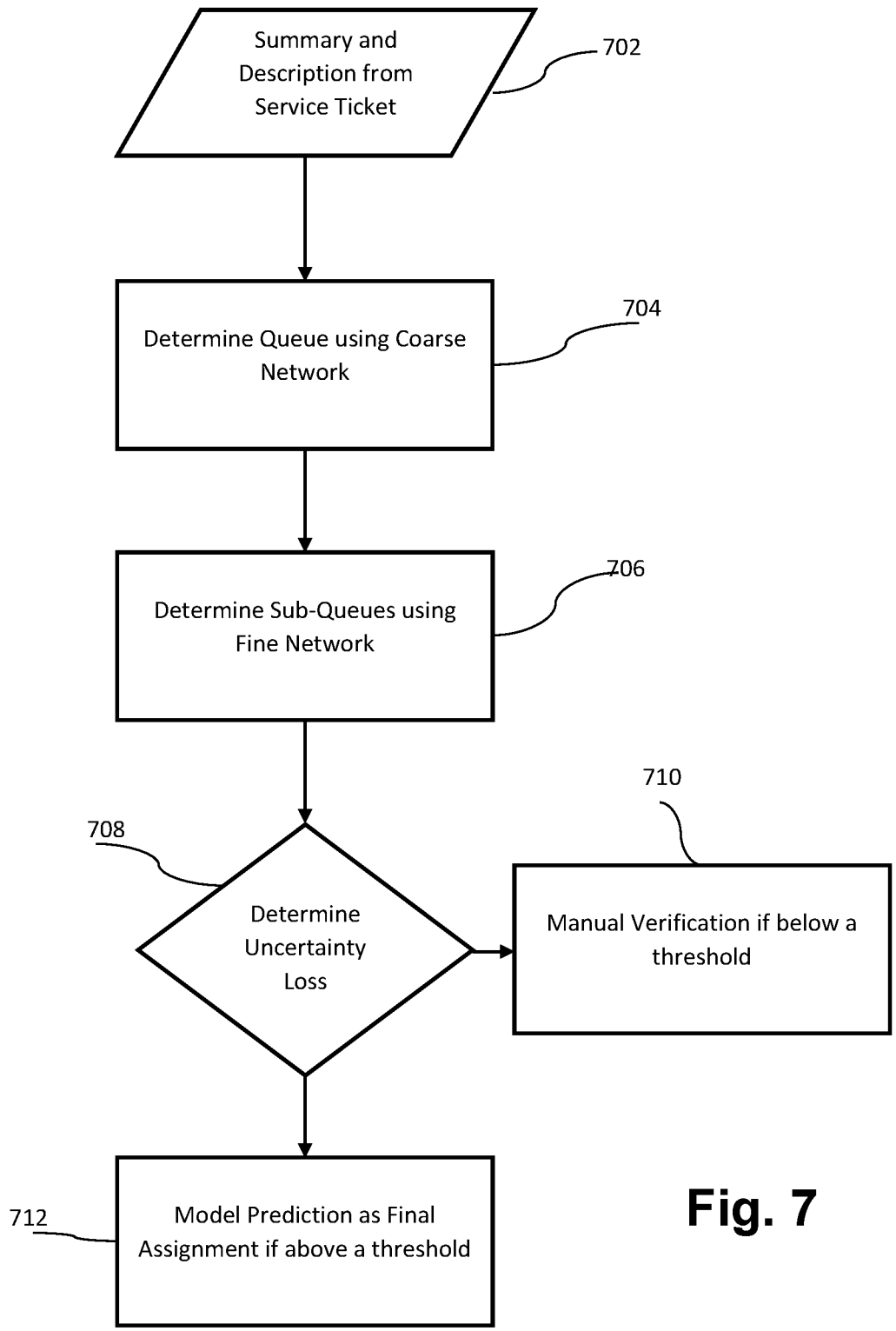
FIG. 7 is a flow diagram of the functionality of the service ticket assignment module of FIG. 2 when assigning a service ticket to the optimized queue/sub-queue in accordance with one embodiment.

FIG. 7 is a flow diagram of the functionality of service ticket assignment module 16 of FIG. 2 when assigning a service ticket to the optimized queue/sub-queue in accordance with one embodiment. In one embodiment, the functionality of the flow diagram of FIG. 7 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 702, the service ticket is parsed and the summary and description of the issue is extracted.

At 704, the summary and description is input to a trained neural network model that includes a coarse network and a fine network. The coarse network is used to determine an optimized queue for the service ticket.

At 706, the fine network is used to determine one or more optimized sub-queues for the service ticket.

At 708, the uncertainty loss for the neural network is determined. The uncertainty loss is based on a coarse loss and a fine loss.

At 710, if the uncertainty loss is above a threshold, a manual verification is implemented.

At 712, if the uncertainty loss is below the threshold, the final queue/sub-queue prediction from 706 and 708 is used as the final assignment.

As disclosed, embodiments predict a first level queue and then reach a next level queue by giving attention to components within the same queue, as disclosed above in connection with the coarse probabilities values which function as the attention weights in the transform2 function 414 of FIG. 4. In contrast, in known solutions, all of the children of all the queues are equally inspected after the parent assignment. Further, embodiments quantify the certainty of the assignment, which helps in improving the robustness of the overall system performance and also act as a reference point when a manual verification may be required. The certainty value is used to check the surety of the model prediction. If the certainty value is below a threshold, the ticket is sent for manual verification, and if it is greater than the threshold then the model prediction is directly used as the final assignment.

Embodiments do not need a conversational bot for additional questions as the entire description of very large sequences is supported by the network disclosed above, which as a result minimizes the need of extra information. Further, in contrast to using systems of hierarchical networks, embodiments allow the model itself to route between the nodes from root to leaves using the probability scores. To enable robustness, embodiments include a certainty score for the predictions which determines the surety level of the predictions done by the system thus eliminating the need for manual verification.

To improve the performance with respect to the recall per class metrics, embodiments include a loss function depending upon the ratio (#minority_samples/#majority_samples) which works well for real world ticket datasets which are highly skewed in nature in terms of distribution of number of datapoints per class.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of assigning a service ticket corresponding to a service problem to a hierarchical queue and a hierarchical sub-queue, the method comprising:
   extracting from the service ticket, by parsing the service ticket, a summary of the service problem and a description of the service problem;
   providing as dual inputs to a trained neural network model the summary and description, the trained neural network model comprising a coarse network and a fine network, each of the summary and description received as separate inputs to an embedding layer that outputs a sequence of embedding vectors corresponding to each of the summary input and the description input;
   creating positional encodings separately for each of the embedding vectors;
   predicting the hierarchical queue using the coarse network of the trained neural network in response to the summary and the description;
   predicting the hierarchical sub-queue using the fine network of the trained neural network by using a transformation by a neural network transform function of the hierarchical queue prediction from the coarse network;
   determining an uncertainty loss for the neural network model, the uncertainty loss based on a coarse loss and a fine loss;
   when the uncertainty loss is below a predefined threshold, assigning the service ticket to the predicted hierarchical queue and hierarchical sub-queue;
   wherein the predicting the hierarchical queue and predicting the hierarchical sub-queue comprises generating a plurality of coarse classes and a plurality of fine classes;
   generating a backpropagation comprising a total loss of the trained neural network model and computing a corresponding gradient loss for each of weights of the model and using the gradient to update each of the weights, the backpropagation comprising a recall loss and the coarse loss of the coarse network and the fine network.

2. The method of claim 1, wherein the uncertainty loss comprises the coarse loss comprising a categorical cross entropy (CCE) loss for coarse classes and the fine loss comprising a CCE loss for fine classes.

3. The method of claim 2, wherein the fine loss comprises:

$Pred(c, f) = Prob(c) * Prob(f)$, where c is the superclass of f, and c is the coarse class and f is the fine class.

4. The method of claim 2, wherein the coarse loss comprises:

$CoarseLoss = -Pred(c_{true}) * \log\_e(Pred(c_{true}))$ where c is the coarse class.

5. The method of claim 1, neural network model further comprising the recall loss comprising:

$$RecallLoss = 1 - \frac{\lambda}{N}\sum_i Recall_i$$

where N is a number of classes, $i \in \{1,2,3, \ldots, N\}$ and $$\lambda = \frac{\text{\# samples in minority classes}}{\text{\# samples in majority classes}}.$$

6. The method of claim 1, wherein the coarse network comprises an embedding layer that receives the summary and description and provides an embedding sequence to a Multi-Head Self Attention layer.

7. The method of claim 1, wherein the fine network transforms inputs from the coarse network that are fed into a bidirectional long short-term memory (LSTM) layer.

8. A non-transitory computer-readable medium having instructions stored thereon that, when executed by one or more processors, cause the processors to assign a service ticket corresponding to a service problem to a hierarchical queue and a hierarchical sub-queue, the assigning comprising:

extracting from the service ticket, by parsing the service ticket, a summary of the service problem and a description of the service problem;

providing as dual inputs to a trained neural network model the summary and description, the trained neural network model comprising a coarse network and a fine network, each of the summary and description received as separate inputs to an embedding layer that outputs a sequence of embedding vectors corresponding to each of the summary input and the description input;

creating positional encodings separately for each of the embedding vectors;

predicting the hierarchical queue using the coarse network of the trained neural network in response to the summary and the description;

predicting the hierarchical sub-queue using the fine network of the trained neural network by using a transformation by a neural network transform function of the hierarchical queue prediction from the coarse network;

determining an uncertainty loss for the neural network model, the uncertainty loss based on a coarse loss and a fine loss;

when the uncertainty loss is below a predefined threshold, assigning the service ticket to the predicted hierarchical queue and hierarchical sub-queue;

wherein the predicting the hierarchical queue and predicting the hierarchical sub-queue comprises generating a plurality of coarse classes and a plurality of fine classes;

generating a backpropagation comprising a total loss of the trained neural network model and computing a corresponding gradient loss for each of weights of the model and using the gradient to update each of the weights, the backpropagation comprising a recall loss and the coarse loss of the coarse network and the fine network.

9. The computer-readable medium of claim 8, wherein the uncertainty loss comprises the coarse loss comprising a categorical cross entropy (CCE) loss for coarse classes and the fine loss comprising a CCE loss for fine classes.

10. The computer-readable medium of claim 9, wherein the fine loss comprises:

$Pred(c, f) = Prob(c)*Prob(f)$, where c is the superclass of f, and c is the coarse class and f is the fine class.

11. The computer-readable medium of claim 9, wherein the coarse loss comprises:

$CoarseLoss = -Pred(c_{true})*\log\_e(Pred(c_{true}))$ where c is the coarse class.

12. The computer-readable medium of claim 8, neural network model further comprising the recall loss comprising:

$$RecallLoss = 1 - \frac{\lambda}{N}\sum_i Recall_i$$

where N is a number of classes, $i \in \{1,2,3, \ldots, N\}$ and $$\lambda = \frac{\text{\# samples in minority classes}}{\text{\# samples in majority classes}}.$$

13. The computer-readable medium of claim 8, wherein the coarse network comprises an embedding layer that receives the summary and description and provides an embedding sequence to a Multi-Head Self Attention layer.

14. The computer-readable medium of claim 8, wherein the fine network transforms inputs from the coarse network that are fed into a bidirectional long short-term memory (LSTM) layer.

15. An information technology service management system comprising:

a hierarchical queue and at least one hierarchical sub-queue;

a trained neural network model comprising a coarse network and a fine network; and one or more processors configured to assign a received service ticket corresponding to a service problem into the hierarchical queue and the hierarchical sub-queue, the assigning comprising:

extracting from the service ticket, by parsing the service ticket, a summary of the service problem and a description of the service problem;

providing as dual inputs to a trained neural network model the summary and description, the trained neural network model comprising a coarse network and a fine network, each of the summary and description received as separate inputs to an embedding layer that outputs a sequence of embedding vectors corresponding to each of the summary input and the description input;

creating positional encodings separately for each of the embedding vectors;

predicting the hierarchical queue using the coarse network of the trained neural network in response to the summary and the description;

predicting the hierarchical sub-queue using the fine network of the trained neural network by using a transformation by a neural network transform function of the hierarchical queue prediction from the coarse network;

determining an uncertainty loss for the neural network model, the uncertainty loss based on a coarse loss and a fine loss;

when the uncertainty loss is below a predefined threshold, assigning the service ticket to the predicted hierarchical queue and hierarchical sub-queue;

wherein the predicting the hierarchical queue and predicting the hierarchical sub-queue comprises generating a plurality of coarse classes and a plurality of fine classes;

generating a backpropagation comprising a total loss of the trained neural network model and computing a corresponding gradient loss for each of weights of the model and using the gradient to update each of the weights, the backpropagation comprising a recall loss and the coarse loss of the coarse network and the fine network.

16. The system of claim 15, wherein the uncertainty loss comprises the coarse loss comprising a categorical cross entropy (CCE) loss for coarse classes and the fine loss comprising a CCE loss for fine classes.

17. The system of claim 16, wherein the fine loss comprises:

$$\text{Pred}(c, f) = \text{Prob}(c)*\text{Prob}(f), \text{ where } c \text{ is the superclass of } f,$$

and c is the coarse class and f is the fine class.

18. The system of claim 16, wherein the coarse loss comprises:

$$\text{CoarseLoss} = -\text{Pred}(c_{true})*\log\_e(\text{Pred}(c_{true}))$$

where c is the coarse class.

19. The system of claim 15, neural network model further comprising the recall loss comprising:

$$RecallLoss = 1 - \frac{\lambda}{N}\sum_i Recall_i$$

where N is a number of classes, $i \in \{1,2,3,\ldots,N\}$ and $$\lambda = \frac{\text{\# samples in minority classes}}{\text{\# samples in majority classes}}.$$

20. The system of claim 15, wherein the coarse network comprises an embedding layer that receives the summary and description and provides an embedding sequence to a Multi-Head Self Attention layer and the fine network transforms inputs from the coarse network that are fed into a bidirectional long short-term memory (LSTM) layer.

* * * * *